Jan. 18, 1927.                    1,615,118
J. FARRAGHER ET AL
GAUGE GLASS FOR BOILERS
Filed July 18, 1925          2 Sheets-Sheet 1
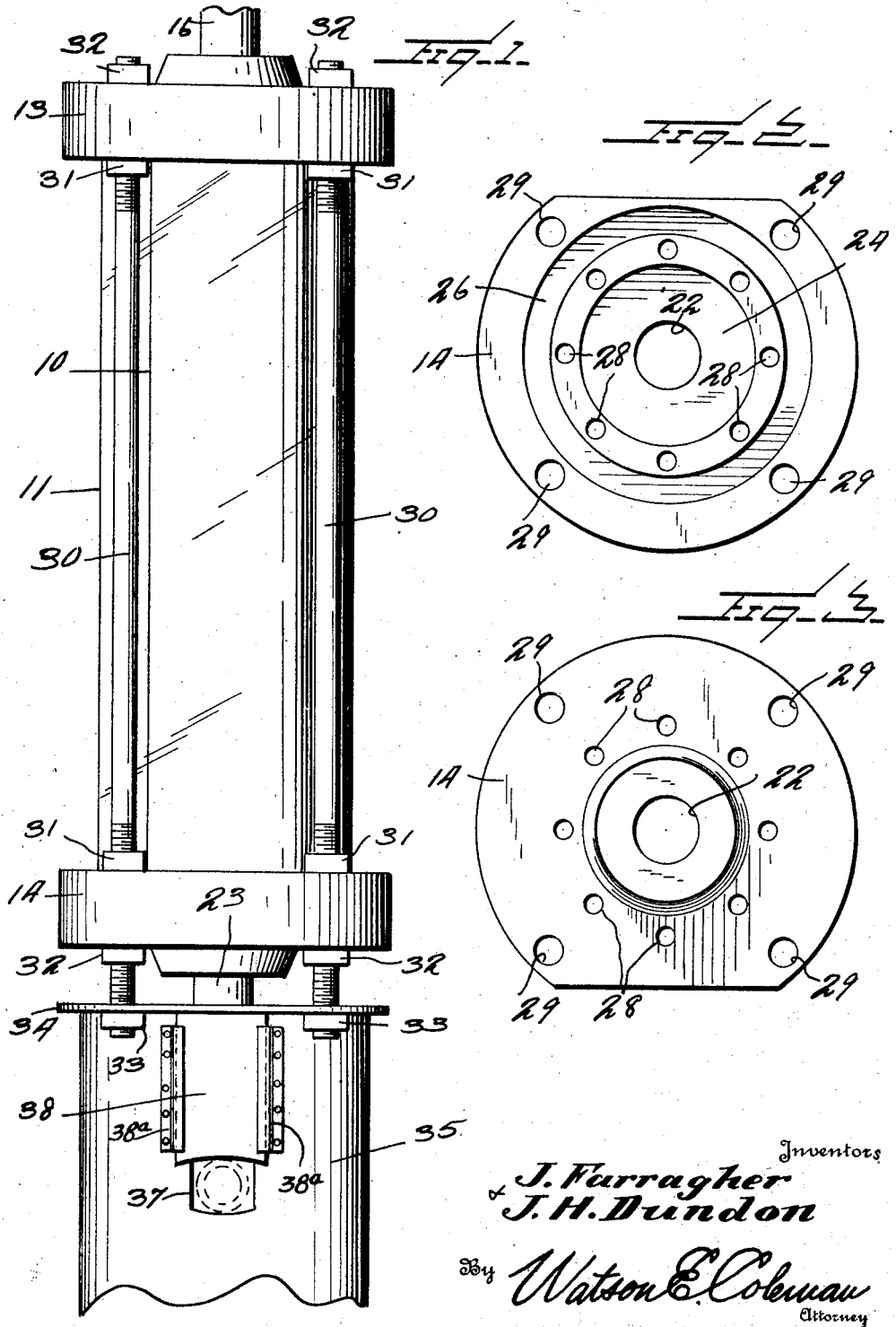
Inventors
J. Farragher
& J. H. Dundon
By Watson E. Coleman
Attorney Jan. 18, 1927. 1,615,118
J. FARRAGHER ET AL
GAUGE GLASS FOR BOILERS
Filed July 18, 1925 2 Sheets-Sheet 2

Inventors
J. Farragher
& J. H. Dundon
By Watson E. Coleman
Attorney

Patented Jan. 18, 1927.

1,615,118

UNITED STATES PATENT OFFICE.

JOHN FARRAGHER AND JOHN HENRY DUNDON, OF YOUNGSTOWN, OHIO.

GAUGE GLASS FOR BOILERS.

Application filed July 18, 1925. Serial No. 44,536.

This invention relates to water glasses or gauge glasses for locomotives, stationary boilers and other boilers, and the general object of the invention is to provide a safety gauge glass so constructed that in case the interior gauge glass is burst, cracked or split under pressure a transparent shield which surrounds the gauge glass proper will hold the pieces of the cracked or burst water glass and water and steam under pressure will escape through pressure escape holes to a shield pipe extending to the atmosphere.

A further object is to provide a device of this kind which is simple, strong, rigid, and in which the water level can be seen from all directions and partly magnified.

A still further object is to provide a device of this character in which the upkeep cost is relatively small and in which the gauge glass is so constructed that any leakage of steam or water may be absolutely prevented.

Other objects will appear in the course of the following description.

Our invention is illustrated in the accompanying drawings, wherein:—

Figure 1 is a side elevation of a boiler gauge glass constructed in accordance with our invention;

Figure 2 is an upper side face view of the lower head;

Figure 3 is an under side view thereof;

Figure 4:
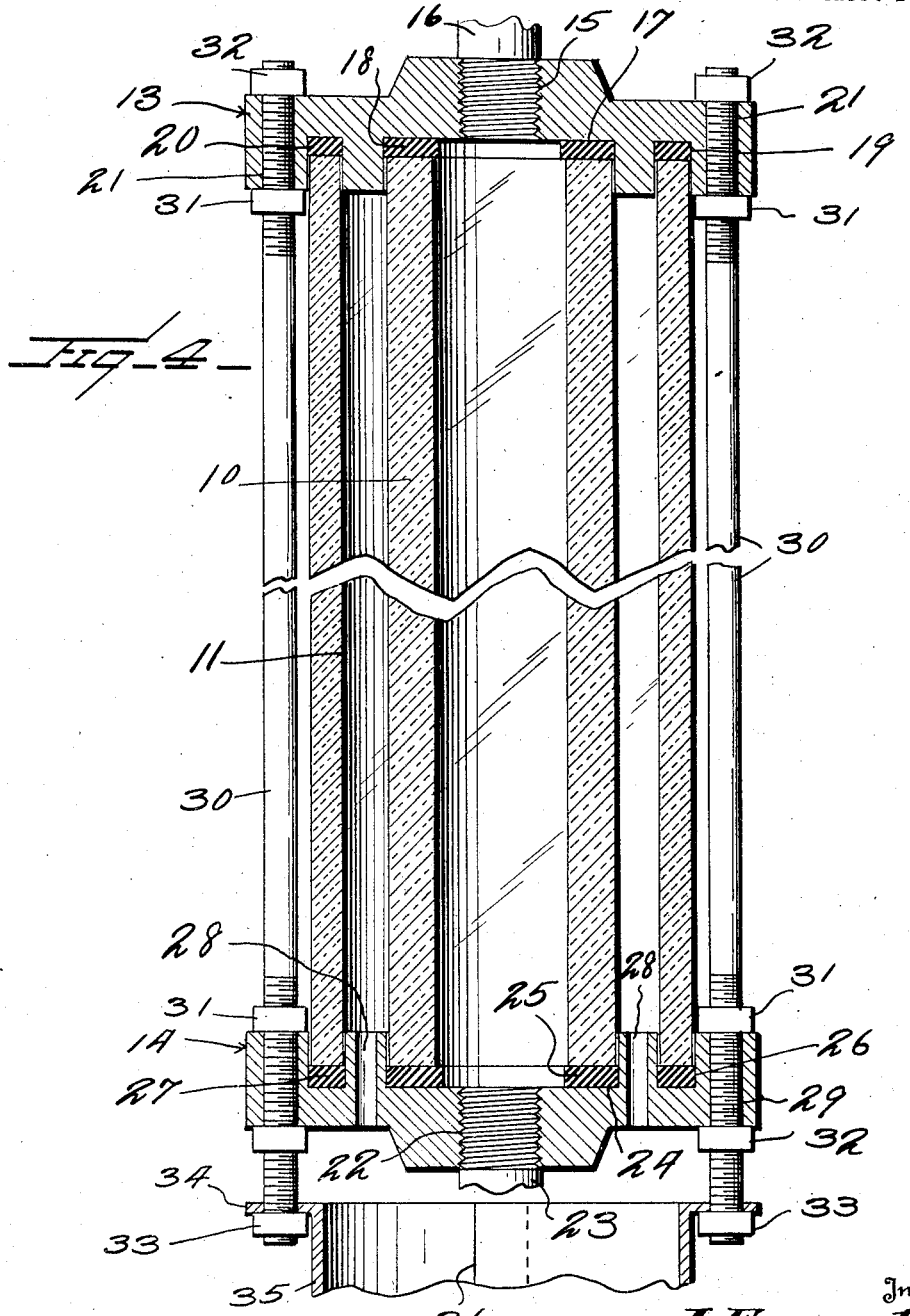
Figure 4 is a vertical sectional view through the gauge glass showing a fragment of the shield 35.

Referring to these drawings, 10 designates the interior water glass, which is preferably about three-eighths of an inch thick and may have any desired length, and 11 indicates the exterior shield glass which is larger in interior diameter than the exterior diameter of the water glass so as to provide a space between the two glasses. This exterior shield glass is preferably about one-quarter of an inch in thickness. These two cylindrical glasses are held between the heads 13 and 14. These heads have the same form and the upper head 13 has a central aperture 15 engaging with the water pipe 16 which leads from the boiler. This aperture is preferably screw-threaded for engagement with this pipe. The central portion of the inner face of the head 13 is recessed at 17, this recess having a diameter equal to the exterior diameter of the water glass 10, and gaskets 18 of suitable packing material are disposed in this recess.

Concentric with the central recess 17 the head 13 is annularly recessed, as at 19, for the reception of the upper end of the shield glass 11 and this recess carries the packing 20. This cap or head is flattened on one side edge so that it may fit up close against a boiler and is provided with four bolt apertures 21 equally spaced from each other. The lower head 14 has the central opening 22 for the pipe 23 leading therefrom to the boiler and is formed with a central recess 24 having a diameter equal to the exterior diameter of the water glass 10 and carrying the packing ring 25. Concentric with this recess there is an annular recess 26 for the reception of the outer or shield glass and provided with packing 27. The space between the inner recess 24 and the recess 26 is formed with a plurality of vertically extending passages or openings 28 to permit the discharge of steam and water under pressure in case the gauge glass should break.

The outer margin of this head or cap 14 is provided with the apertures 29 aligning with the like apertures 21 in the upper head or cap. Bolts 30 pass through the apertures in the upper and lower caps or heads, these bolts carrying the inner nuts 31 and the outer nuts 32. The inner nuts bear against the inner faces of the two heads or caps, while the outer nuts bear against the outer faces of these nuts or caps and thus the heads or caps are held in tight engagement with the ground ends of the inner and outer glasses 10 and 11. Obviously, by loosening up on the nuts 31 and tightening up on the nuts 32, the two heads may be drawn toward each other and in tight engagement with the packing in the recesses receiving the upper and lower gauge glasses.

The lower ends of the rods 30 carry the nuts 33 and supported by these nuts 33 is the flange 34 of a pressure escape pipe 35 which is made of sheet metal and is designed to carry away escaping steam and water if the water glass should happen to burst, crack or split. This shield pipe or escape pipe 35 is formed of sheet metal and the margins of the sheet metal strip which form this shield pipe are overlapped, as at 36, so as to provide for a quick fit of the shield pipe on the boiler. This overlapped portion faces toward the boiler. The shield pipe or escape pipe 35 is also formed with a longitudinally extending opening 37 which permits the escape pipe to fit up around the lower nigger-stem or nigger pipe on the boiler. The upper portion of this slot is closed by the slide 38 which is held in sliding engagement with the walls of the slot as by the guides 38ª.

Our improved water glass has numerous points of advantage over other water glasses. It is particularly simple and neat in construction and very rigid. The water level can be seen from all directions inasmuch as the only parts which obscure the water level at all are the four bolts 30. The water level is seen partly magnified, whereas in order to partly magnify the water level in other makes of gauge glasses it is necessary to have two glasses. It is very durable because of its simplicity and rigidity of construction and because of the thickness of the water glass proper and of the shield glass. It is particularly quick in action because of the relatively large internal diameter of the water glass 10 and, as before remarked, it is particularly safe because if the water glass should burst, crack or split the shield glass, which is of heavy material, will prevent the pieces from flying and will hold the steam and water in and the steam will escape through the pressure escape holes 28 down through the shield pipe to the atmosphere. If from time to time the packing needs to be more tightly packed it is only necessary to tighten up on the nuts on the rods 30 which will thus force the two heads or caps more firmly toward each other. At the same time whenever it is necessary to disassemble the parts of the gauge glass this may be very readily done.

We claim:—

1. A gauge glass of the character described having upper and lower heads, a central water glass, an outer shield glass spaced from the central water glass, the glasses being disposed between said heads, means whereby the heads may be urged toward each other to thereby clamp the glasses in place, the lowermost head having apertures communicating with the space between the outer and inner glasses, a shield pipe depending from the lower head and into which the apertures discharge, said shield pipe having a longitudinally extending opening to receive the nigger pipe through the boiler, and a slide shiftable over said opening.

2. A gauge glass of the character described comprising upper and lower heads, each head being formed with a central seat and an annular seat concentric thereto, a central water glass disposed with its ends in the central seats, an exterior shield glass disposed with its ends in the annular seats, bolts passing through the heads and having nuts engaging the heads, said bolts extending down below the lower head and having nuts thereon, the heads having apertures for the passage of the bolts and a sheet metal shield pipe having an apertured flange at its upper end through which apertures the lower ends of said bolts extend, and means on the lower ends of said bolts supporting said shield pipe, the shield pipe being formed of sheet metal and having a lap joint on its inside face the lower head being formed with apertures between the water glass and the outer shield glass said apertures discharging into the shield pipe if the central water glass becomes broken.

In testimony whereof we hereunto affix our signatures.

JOHN FARRAGHER.
JOHN HENRY DUNDON.